United States Patent [11] 3,628,435

[72] Inventor Hubert Nerwin
  Rochester, N.Y.
[21] Appl. No. 871,620
[22] Filed Nov. 6, 1969
[45] Patented Dec. 21, 1971
[73] Assignee Eastman Kodak Company
  Rochester, N.Y.
  Continuation of application Ser. No.
  667,894, Sept. 15, 1967, now Patent No.
  3,490,350, dated Jan. 20, 1970. This
  application Nov. 6, 1969, Ser. No. 871,620

[54] FILM MAGAZINE LOCATING MEANS
  7 Claims, 4 Drawing Figs.
[52] U.S. Cl. .................................................. 95/31 CA,
  352/78 R
[51] Int. Cl. .................................................. G03b 17/26,
  G03b 17/30
[50] Field of Search ........................................ 95/31 R, 31
  CA; 242/71.2; 352/72, 78

[56] References Cited
UNITED STATES PATENTS

| | | | |
|---|---|---|---|
| 3,247,773 | 4/1966 | Doblin .......................... | 95/31 |
| 3,260,182 | 7/1966 | Nerwin .......................... | 95/31 |
| 3,422,740 | 1/1969 | Nerwin .......................... | 95/31 |
| 3,426,666 | 2/1969 | Shigeaki Nagata ........... | 95/31 X |
| 3,347,142 | 10/1967 | Steisslinger ................... | 95/31 |

*Primary Examiner*—Samuel S. Matthews
*Assistant Examiner*—Russell E. Adams, Jr.
*Attorneys*—Robert W. Hampton and Malcolm G. Dunn ABSTRACT: A film magazine includes a front-casing member provided with an exposure aperture and a rear-casing member defining a film-support surface adapted to support a film exposure area in the focal plane of the lens system of a corresponding camera. The magazine is characterized by forwardly facing support surface means defined in predetermined relation to the film-support surface by the rear-casing member of the magazine and adapted to engage corresponding rearwardly facing support-surface means located on the camera in predetermined relation to the lens system thereof.

HUBERT NERWIN
INVENTOR.

BY Malcolm J. Dunn
Robert W. Hampton

ATTORNEYS

PATENTED DEC 21 1971

HUBERT NERWIN
INVENTOR.

BY Malcolm J. Dunn
Robert W Hampton

ATTORNEYS

FILM MAGAZINE LOCATING MEANS

CROSS-REFERENCE TO RELATED APPLICATIONS

Reference is made to commonly assigned U.S. Pat. application Ser. No. 667,893, now U.S. Pat. No. 3,490,350 "Film Magazine Locating Means," filed in the names of Albert M. Hardies and Harry L. Fanning on Sept. 15, 1967.

The present invention relates to film magazines of the type which include means for supporting an exposure frame of the film in the magazine at the focal plane of the lens system embodied in a camera adapted to receive the magazine, and particularly to such magazines of the type disclosed in U.S. Pat. Nos. 3,138,081 and 3,138,084, issued to the assignee of the present invention on June 23, 1964.

In film magazines of the type described in the above-identified patents, the position and flatness of the film exposure frame are established by means of a flat film-support surface defined rearwardly adjacent the exposure frame portion of the film by the back-casing member of the magazine. The front magazine-casing member, which is formed separately from the back-casing member and joined thereto during assembly of the magazine, includes a film-exposure aperture and guide means for maintaining the exposure frame portion of the film in supported cooperation with the film-support surface. In prior magazines of this type, the front-casing member also defines seating surface means adjacent the exposure aperture, which are adapted to seat against cooperating surface means in the camera structure to position the magazine in predetermined relation to the camera-lens system, so that the exposure frame will lie in the focal plane thereof. However, since the film-support surface defined by the rear-casing member is the surface which must be positioned with critical accuracy relative to the lens system, the employment of support surface means on the front-casing member to locate the exposure frame relative to the lens system requires the two casing members to be joined with correspondingly critical accuracy to insure the establishment of a precise predetermined relation between the film-support surface and the seating surface means on the front casing. In the present commercially produced magazines of the type disclosed in the above-mentioned U.S. Pat. No. 3,138,081, the two casing members are formed of molded plastic with the precise relation of the two assembled members being established by internal abutment surfaces. Due to the high degree of dimensional accuracy with which these abutment and seating surfaces must be located to provide acceptable magazines, this form of construction dictates a correspondingly high degree of accuracy in the manufacture and maintenance of the molds used to produce the casing members and similarly critical control of the molding and assembly operations. While these conditions can be realized by highly skilled technicians employing sophisticated production equipment, for practical purposes the difficulties involved require the redefinition of an "acceptable" magazine to provide more realistic but less desirable tolerance limitations, particularly if the magazines are to be produced in quantities which are insufficient to justify the expense associated with such highly sophisticated production apparatus and techniques.

The present invention greatly reduces the tolerance problems inherent in the above-described type of magazine construction by substantially reducing the criticality of the dimensional relation of the two casing members. This is accomplished by providing the critical magazine-seating surface means directly on the rear-casing member, which also defines the film-support surface, whereby the relation of the assembled casing members need be only within the substantially wider tolerance limitations required to maintain the film-exposure area in supported cooperation with the film-support surface.

To illustrate more specifically the invention summarized above, the following detailed description described a preferred embodiment of the invention, reference being made to the accompanying drawings in which like reference numerals refer to like elements and in which.

Figure 1:
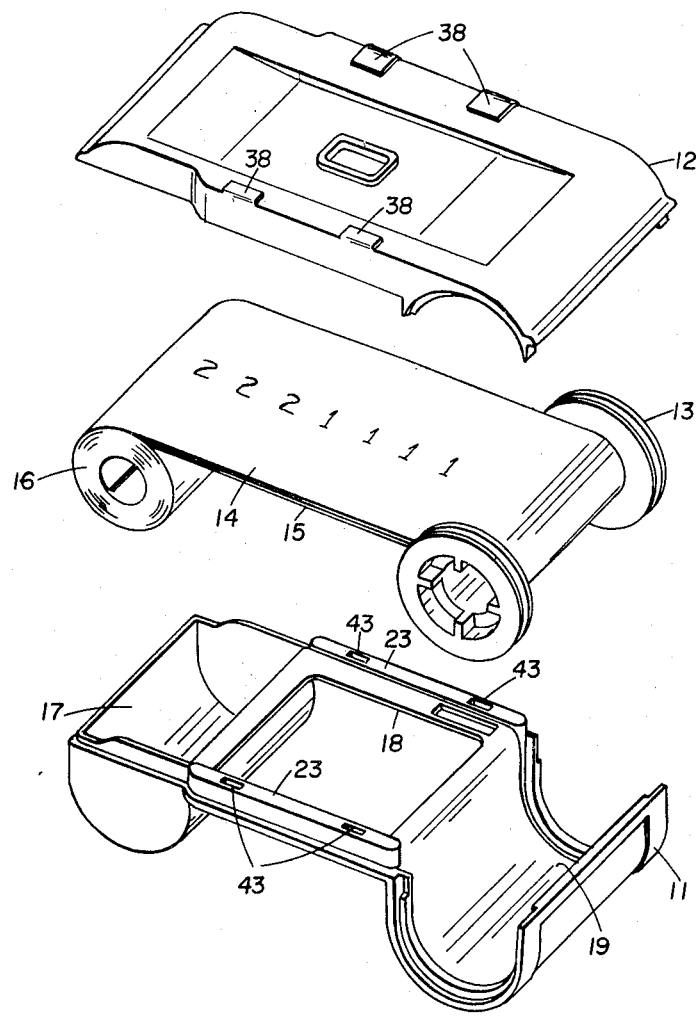
FIG. 1 is an exploded perspective view of a loaded film magazine according to the present invention.
Figure 2:
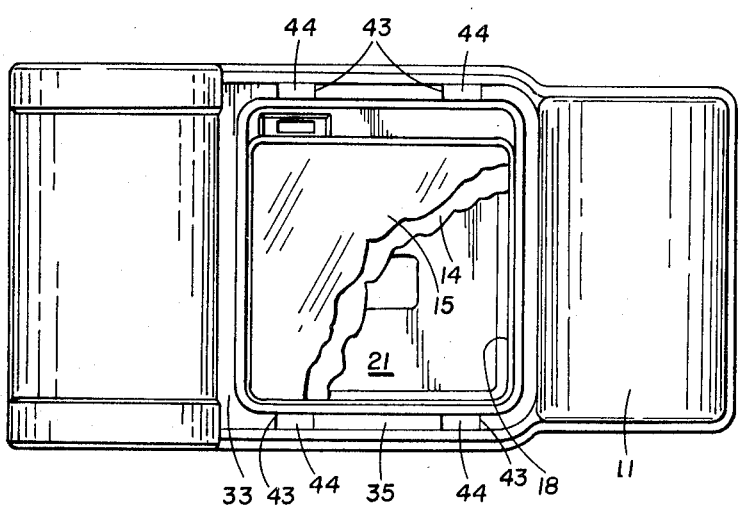
FIG. 2 is an enlarged front elevational view of the loaded magazine shown in FIG. 1 with a portion of the film and its protective backing paper shown broken away in the exposure frame area thereof.
Figure 4:
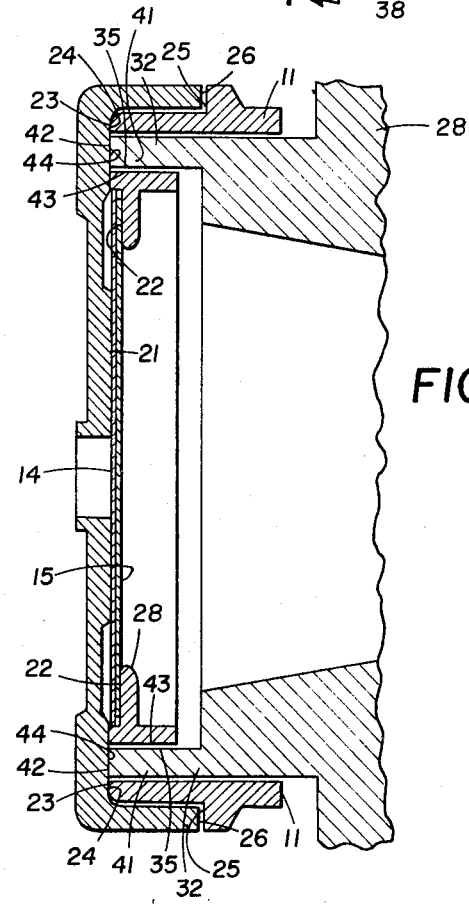
FIG. 4 is an enlarged partial cross-sectional view through the film magazine taken along the lines 4—4 of FIG. 3, showing also in cross section a portion of the magazine support member of the camera in supporting engagement with the magazine.

Referring first to FIG. 1, the film magazine comprises a molded plastic front-casing member 11, a molded plastic rear-casing member 12, a molded plastic spool 13, a strip of light protective paper 14 attached to the spool and a length of film 15 attached to the protective paper at the end of the film adjacent the spool. In the assembled magazine the film initially is wound upon itself to form a film-supply roll 16, which is housed in the film-supply chamber 17 formed by the cooperation of the two casing members. The end of the protective paper beyond the filmstrip extends across the exposure aperture 18 in the forward wall portion of the front-casing member and is attached to the spool, located in the similarly defined takeup chamber 19. With the magazine components so disposed, the rear-casing member is cemented or otherwise permanently joined to the front-casing member, as hereinafter described, thus completing the assembly operation, with the film being housed entirely within the supply chamber. When the magazine is loaded into a camera, the spool is engaged by a winding mechanism, whereby the film and paper are wound onto the spool to move successive exposure frame areas of the film into alignment with the exposure aperture as shown in FIG. 2. To locate the film-exposure area adjacent the aperture in a flat plane in predetermined relation to the magazine structure, the rear wall portion of the back-casing member is provided with a slightly raised flat rectangular support surface 21, as shown in FIGS. 2 and 4, against with the film and paper are maintained in flat supported engagement by means of a rectangular rearwardly facing surface 22 surrounding the exposure aperture and engaging the film about the margin of the exposure-frame area thereof. As shown in FIG. 4, this rearwardly facing surface 22 is spaced forwardly from surface 21 at a distance equal approximately to the combined thickness of the film and paper, by the engagement of rearwardly facing abutment surfaces 23 on the front-casing member with corresponding areas of a flat forwardly facing surface 24, located in generally concentric parallel relation to support surface 21 on the back cover member; such engagement being maintained by cementing or otherwise joining the two casing members along the adjacent edge surfaces 25 and 26 thereof.

Figure 3:
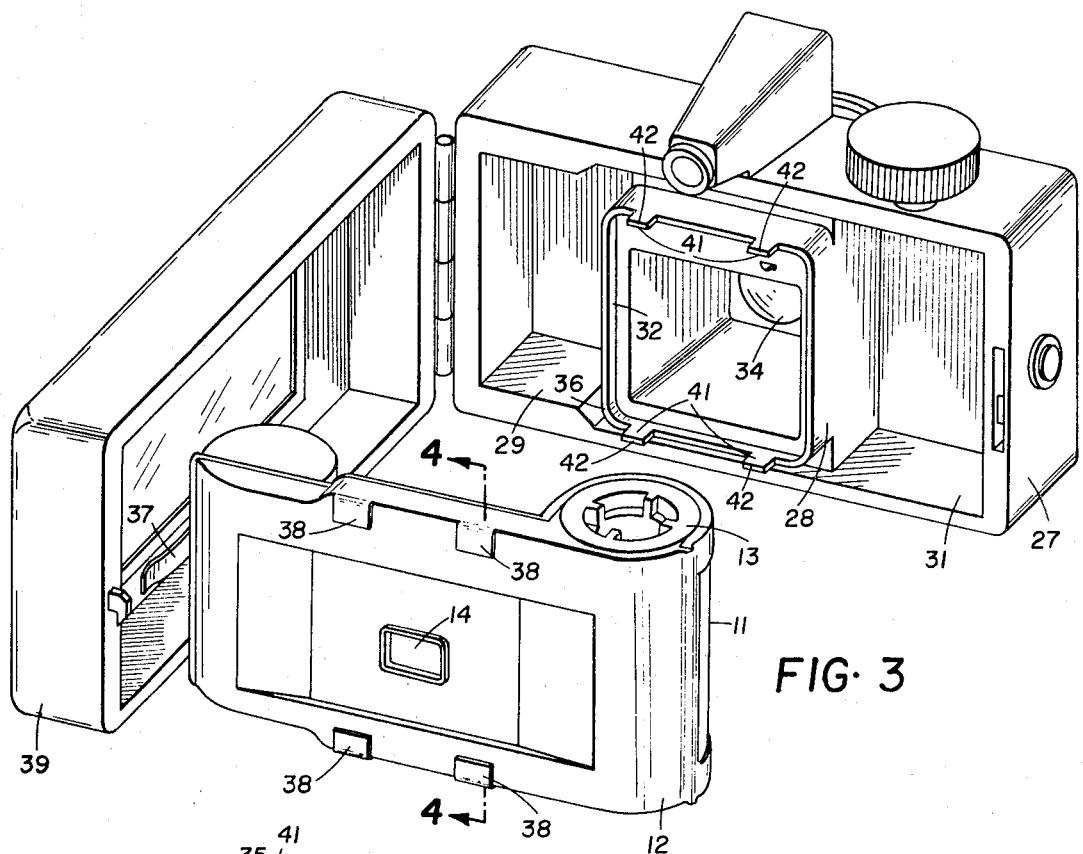
FIG. 3 is a perspective view of a camera showing the film magazine in position for insertion into the camera.

As shown in FIG. 3, a camera adapted to accommodate the film magazine may comprise a main housing 27 provided with a central boxlike member 28 located between chambers 29 and 31, adapted respectively to receive freely the film supply and takeup chamber portions of the magazine. A continuous rearwardly projecting rib 32 is provided along the rearward portion of member 28, and is adapted to be received by a corresponding channel 33 surrounding the exposure aperture of the magazine as shown in FIG. 2, whereby the cooperating rib and channel form a labyrinth light barrier between the two units so that, of the camera components, only the boxlike member 28 need be lighttight.

To position the magazine with the film-exposure area in the focal plane of lens 34 at the front of camera member 28, the previous similar construction utilized the bottom surface 35 of channel 33 and the edge surface 36 of rib 32 as cooperating magazine-seating surfaces, with these two surfaces being held in resilient engagement by spring members, as shown at 37, adapted to engage corresponding pressure pads 38 on the magazine when the back cover door 39 of the camera is closed. This structure and other details of the magazine and camera construction to which the present invention also relates are disclosed in the above-identified U.S. Pat. No. 3,138,081. As previously discussed, in order to locate the film-exposure area exactly in the focal plane of the camera lens, this prior construction requires the bottom channel surface 35 to be located relative to film-support surface 21 within tolerance limitations much more exacting than the corresponding limitations associated with establishing the location of film-guide surface 22 relative to film-support surface 21.

To eliminate the necessity for maintaining this very critical dimensional relation between the front and rear casing members, the present invention utilizes the cooperating channel-and-rib structure to provide light-sealing means between the magazine and camera member 28, but the magazine is supported with edge surface 36 of rib 32 out of supporting contact with the bottom channel surface 35 and other surfaces defined by the front-casing member. As best shown in FIGS. 3 and 4, this is accomplished by providing a camera rib 32 with rearwardly extending projections 41 defining rearwardly facing seating surfaces 42 in predetermined relation to lens 34. These projections are adapted to extend rearwardly from rib 32 through corresponding openings 43 located in the front-casing member along channel 33, and into supporting contact with forwardly facing seating areas 44 of the same surface that serves to define forwardly facing abutment surfaces 24. Accordingly, the relation of the two casing members to one another, as established by cooperating surfaces 23 and 24, need be maintained only within the relatively wide tolerance limitations associated with maintaining the film and paper in supported engagement with surface 21, inasmuch as the critical location of the film-support surface relative to the camera lens is defined directly by seating surface areas 44 on the back cover member, resiliently held by spring members 37 in cooperating engagement with seating surfaces 42, on member 28. Therefore, of the various surfaces defined by the magazine, the only highly critical relation is that of surface areas 44 to surface 21, which relation can be maintained practicably within very close tolerances due to the fact that these surfaces are defined in proximate relation to one another by the same magazine member.

From the foregoing description, it should be apparent that the invention provides simple and straightforward means for simplifying greatly the production, and thereby reducing manufacturing costs, of film magazines of this general type, while at the same time enabling such magazines to be manufactured to closer dimensional tolerances than could be achieved on a mass production basis by utilizing the previously known magazine structure.

The invention has been described in detail with particular reference to a preferred embodiment thereof, but it will be understood that variations and modifications can be effected within the spirit and scope of the invention.

I claim:

1. In a film magazine for use in a photographic camera, the camera having a focal plane and means defining abutment surfaces at predetermined positions relative to the focal plane, the magazine comprising:
   a. a first member including means defining an exposure aperture; and
   b. a second member joined with the first member to form the magazine, said second member having a side toward the first member defining a film-support surface;
the improvement wherein the second member includes:
   c. means defining magazine seating surfaces on the side toward the first member, said seating surfaces being located in predetermined positions relative to the film-support surface, said seating surfaces being engageable directly by the abutment surfaces on the camera to locate the film-support surface at a predetermined position relative to the camera focal plane.

2. The invention defined by claim 1 wherein the camera includes an objective and the magazine-seating surfaces comprise a plurality of abutment elements, said first member being located between the objective and the elements when the magazine is in the camera.

3. The invention defined by claim 2 wherein the first member defines a plurality of openings in alignment with the abutment elements to receive corresponding ones of said camera abutment surfaces when the magazine is in the camera.

4. A film magazine for use in a camera, the camera having a focal plane and seating elements for positioning a cartridge in the camera in predetermined relation to the focal plane, the magazine comprising:
   a. a supply chamber for storing and paying out film;
   b. a takeup chamber for receiving and storing film;
   c. first and second spaced members connecting the supply and takeup chambers for directing film therebetween, said first member including means defining an exposure aperture, said second member including a side toward said first member defining a film plane in which film is supported for exposure; and
   d. cartridge-seating means positioned on said side of said second member and directly engageable by the seating elements in the camera for locating the film plane at a predetermined position relative to the focal plane of the camera.

5. A film magazine as claimed in claim 4 wherein said cartridge-seating means includes seating surfaces directly engageable by the seating elements in the camera, said seating surfaces being located in the film plane defined by the second member.

6. A film magazine for use in a camera, the camera having means defining a focal plane and a plurality of seating elements for positioning the magazine in the camera in predetermined relation to the focal plane, the magazine comprising:
   a. a supply chamber for storing and paying out film;
   b. a takeup chamber for receiving and storing film;
   c. first and second spaced members connecting the supply and takeup chambers, said first member including an exposure aperture, said second member including a side toward said first member defining a substantially planar film-support surface for supporting film in the cartridge between the supply and takeup chambers;
   d. cartridge-seating means on said side of said second member toward the first member for aligning the cartridge in a predetermined position relative to the focal plane of the camera; said seating means defining seating surfaces in the plane of the film support surface; and
   e. apertures in said first member corresponding to respective ones of said seating elements, whereby said seating elements can project through the first member and into direct engagement with the seating surfaces of the second member.

7. In a film magazine for use in a photographic camera having a focal plane and means defining abutment surfaces at predetermined positions relative to the focal plane, the magazine comprising;
   a member having forward and rearward sides, said member defining a film-support surface on the forward side thereof; and
   the improvement wherein said member includes integral means defining magazine-seating surfaces on the forward side thereof, said seating surfaces being located in predetermined positions relative to the film-support surfaces, said seating surfaces being directly engageable by the abutment surfaces on the camera to locate the film-support surface at a predetermined position relative to the camera focal plane.

* * * * *

PO-1050
(5/69)

UNITED STATES PATENT OFFICE
CERTIFICATE OF CORRECTION

Patent No. 3,628,435      Dated December 21, 1971

Inventor(s) Hubert Nerwin

It is certified that error appears in the above-identified patent and that said Letters Patent are hereby corrected as shown below:

On the first printed page of the patent, first column, change paragraph to read ---Continuation of application Ser. No. 667,893 filed September 15, 1967 now abandoned. This application November 6, 1969, Serial No. 871,620---.

Column 1, line 2, delete "667,893" and insert---667,894---.

Column 2, line 39 delete "with" and insert---which---.

Signed and sealed this 18th day of July 1972.

(SEAL)
Attest:

EDWARD M. FLETCHER, JR.
Attesting Officer

ROBERT GOTTSCHALK
Commissioner of Patents